United States Patent [19]
Takashino
[11] 3,779,498
[45] Dec. 18, 1973

[54] MAGNETIC RECORDING AND REPRODUCING APPARATUS

[75] Inventor: Shizuo Takashino, Saitama-ken, Japan
[73] Assignee: Sony Corporation, Tokyo, Japan

[22] Filed: Mar. 10, 1972
[21] Appl. No.: 233,452

[30] Foreign Application Priority Data
Mar. 19, 1971 Japan .............................. 46/15866

[52] U.S. Cl. ................................ 242/204, 274/4 D
[51] Int. Cl. ........................ B11b 15/32, G03b 1/04
[58] Field of Search ......................... 274/4 D, 11 D; 242/186–204

[56] References Cited
UNITED STATES PATENTS
3,469,800 9/1969 Ayukawa et al. .................. 242/190
3,582,013 6/1971 Beretta .............................. 242/186

*Primary Examiner*—Leonard D. Christian
*Attorney*—Lewis H. Eslinger et al.

[57] ABSTRACT

In an apparatus for recording and/or reproducing signals on a magnetic tape which is wound on supply and takeup reels and has its ends secured to the reels, the reels are rotationally coupled with respective reel support members which are selectively urged to rotate in the direction for winding tape on the respective reel upon the manual actuation of a control for causing operation of a reel drive, and a shutoff device is provided which is powered by the reel drive and conditioned in response to the arresting of the rotation of the reel support members, for example, when the tape is fully unwound from one of the reels, during continued operation of the reel drive for causing the control to halt operation of the drive, for example, by de-energizing an electric motor thereof.

18 Claims, 12 Drawing Figures

MAGNETIC RECORDING AND REPRODUCING APPARATUS

This invention relates generally to magnetic tape recording and/or reproducing apparatus, and more particularly is directed to the provision of such apparatus with an improved automatic shut-off mechanism.

With the advent of magnetic tape cassettes, the development of low cost and easily operated recording and/or reproducing apparatus for using such cassettes has become desirable. Such apparatus must be capable of performing all of the tape driving functions required for the recording and reproducing operations. Thus, the apparatus must be simply controllable to provide for advancement or forward movement of the tape at a relatively slow speed during the recording and reproducing operations, and also to provide for the relatively fast reeling of the tape in either the forward or reverse directions to permit rapid rewinding of the tape, or to permit the rapid location of a desired portion of the tape on which signals are to be recorded or reproduced.

Since magnetic tape cassettes have the tape wound on supply and take-up reels which are confined within the cassette housing, it is imperative that the driving of the tape and of the reels be stopped upon the full unwinding of the tape from either of the reels during any of the operating modes of the apparatus in order to avoid the possibility that an end of the tape will be removed and detached from one of the reels within the cassette. If an end of the tape becomes detached from a reel, the cassette housing has to be taken apart to permit rethreading of the tape about the guides provided therefor within the cassette and connection of the tape end to the reel from which it has become detached. The need to disassemble the cassette housing and to rethread the tape within the cassette would obviously sacrifice the major advantage of the cassette type recording and/or reproducing apparatus which is its normal convenience in operation resulting from the fact that mere positioning of the cassette in the apparatus readies the latter for either recording or reproducing operations without the necessity of manually threading the tape in relation to the guides and magnetic head or heads.

Although several arrangements have been proposed and utilized for automatically halting the driving of the tape and reels within the cassette upon the full unwinding of the tape from either of the reels, such existing arrangements all have inherent disadvantages. In one of these previously proposed arrangements, for example, as disclosed in U.S. Pat. No. 3,093,334, a magnetic recording and/or reproducing apparatus for use with tape cassettes is provided with a tension detecting device having an element which extends into the cassette and engages the tape within the latter so that, when the tape is fully unwound from one of the reels, the resulting increased tension in the tape is detected by such device and the latter is effective to halt the operation of the tape drive. However, with the foregoing arrangement, it is necessary to employ a specially designed tape cassette having a suitable opening provided in the cassette housing to permit the entry of the tape engaging element of the tension detecting device. Thus, conventional or standardized tape cassettes cannot be employed. Further, the described arrangement for effecting automatic shut-off of the tape drive is not entirely satisfactory from the point of view of ease of construction and manufacturing costs of the recording and reproducing apparatus.

In another arrangement that has been proposed for effecting the automatic shut-off of the tape drive, the recording and reproducing apparatus is provided with a pair of conductive poles or pins located to extend into the cassette for engagement with the magnetic tape within the latter, and the magnetic tape is provided with conductive leaders at its opposite end portions. With the foregoing arrangement, when the tape is almost fully unwound from either of the reels, the conductive poles detect the presence of the respective conductive leader and a related electrical circuit effects operation of a solenoid or the like by which operation of the tape drive is halted. This arrangement has the obvious disadvantage of being capable of operation only with special tape cassettes, that is, tape cassettes having an opening or openings to receive the conductive poles, and further containing a magnetic tape with conductive leaders at its opposite end portions.

In still another arrangement that has been proposed for effecting the automatic shut-off of the tape drive, the magnetic tape contained within the cassette is provided with thin transparent leaders as its opposite end portions, and the recording and reproducing apparatus is provided with a light source at one side of the tape path which directs a beam of light toward a photocell or other photoconductive element at the opposite side of the tape path. Thus, when the tape is almost fully unwound from one of the reels within the cassette, the thin transparent leader at the respective end portion of the tape passes between the light source and the photocell so that the latter is influenced by light received from the source to cause a related electrical circuit to effect the shut-off of the tape drive. This arrangement is also disadvantageous in that it requires the use of a special tape cassette, that is, one containing a magnetic tape with transparent leaders at its opposite end portions, and further in that the described arrangement for effecting shut-off of the tape drive requires relative frequent maintenance and repair.

Accordingly, it is an object of this invention to provide a recording and reproducing apparatus intended for use with conventional or standardized tape cassettes and which concludes a device by which the operation of the tape drive is automatically halted when the tape is fully unwound from either of the reels within the cassette.

Another object is to provide a recording and reproducing apparatus, as aforesaid, which may be conveniently and safely operated by untrained persons, and in which the tape drive is automatically halted upon the full unwinding of the tape from either of the reels within a cassette during any of the operating modes of the apparatus, that is, during normal forward movement of the tape for recording or reproducing operations as well as during the fast rewinding or fast forward advancement of the tape.

Still another object is to provide a magnetic recording and reproducing apparatus for use with tape cassettes which has pushbutton controls for selecting the various operating modes of the apparatus, and wherein such controls are operatively associated with a device by which the operation of the tape drive, for any of the selected operating modes, is automatically halted upon the full unwinding of the tape from either of the reels.

Still another object is to provide a magnetic recording and reproducing apparatus with an automatic shut-off device, as aforesaid, which device is relatively simple and inexpensive to produce and capable of reliable operation without the need for frequent or costly maintenance or repairs.

A further object of the invention is to provide a magnetic recording and reproducing apparatus with an automatic shut-off device of a mechanical nature which does not require engagement with the tape within a cassette housing, and which does not require special conductive or transparent leaders at the end portions of the magnetic tape, as in certain of the previously proposed automatic shut-off devices.

Still a further object is to provide an automatic shut-off device for a magnetic recording and reproducing apparatus which, during the various operating modes of such apparatus, does not have an adverse influence on the driving of the tape.

In accordance with an aspect of this invention, an apparatus for recording and/or reproducing signals on a magnetic tape extending between two reels to which the ends of the tape are secured and on which the tape is wound, for example, within a cassette, comprises rotatable reel support members for rotational coupling with the respective reels, drive means preferably including an electric motor and having its operation controlled by a control assembly, a transmission assembly for urging a selected one of the reel support members to rotate in the direction for winding tape on the reel respectively coupled therewith in response to operation of the drive means and including relatively slippable elements permitting continued operation of the drive means when rotation of the reel support members is arrested upon the full unwinding of the tape from one of the reels, and a shut-off device powered by the drive means and conditioned by arresting of the rotation of the reel support members during continued operation of the drive means for causing the control assembly to halt the operation of the drive means.

The above, and other objects, features and advantages of this invention, will be apparent from the following detailed description of an illustrative embodiment thereof which is to be read in connection with the accompanying drawings, wherein.

Figure 3:
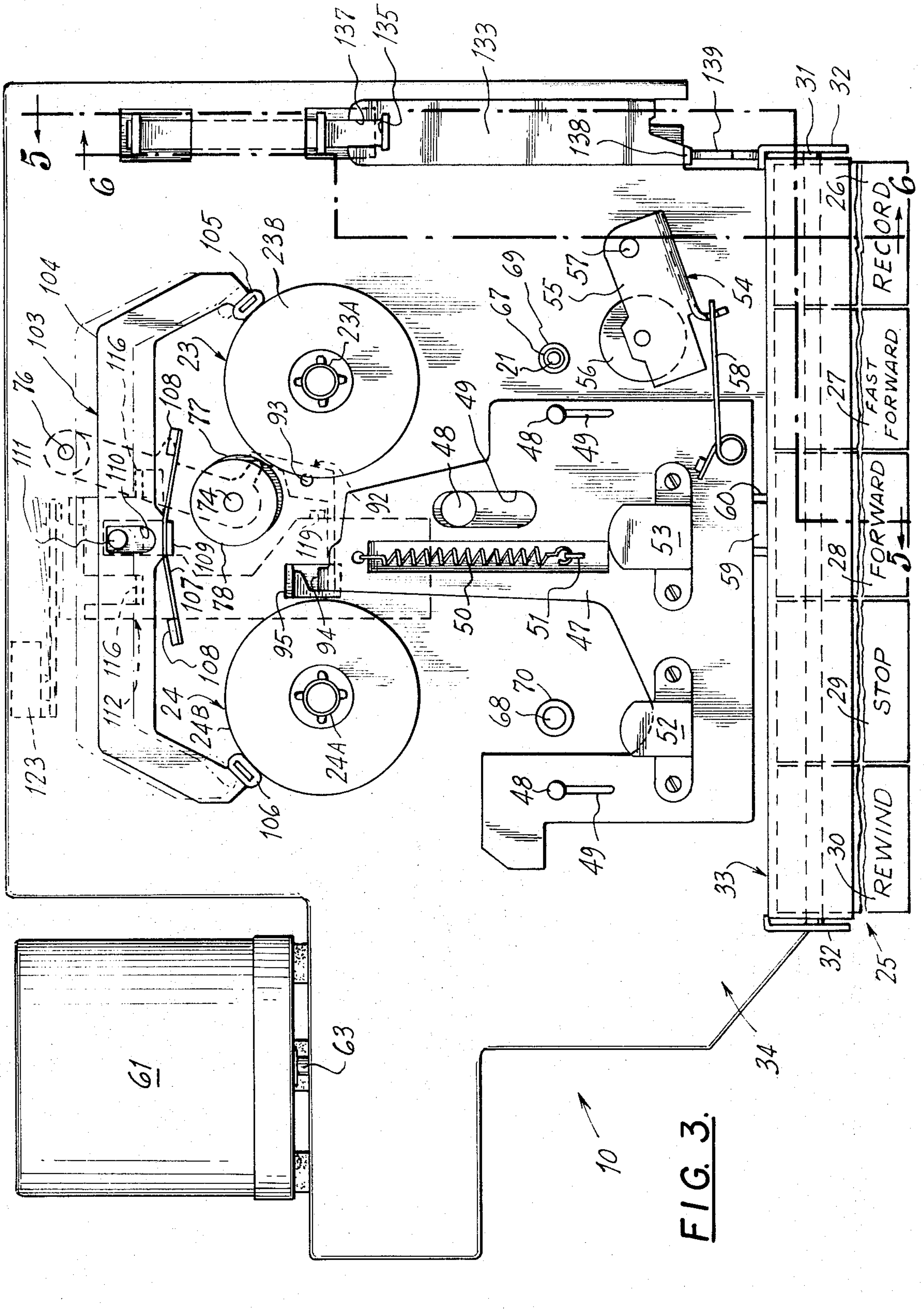
FIG. 3 is an enlarged top plan view of the apparatus of FIG. 1, but with its housing removed.
Figure 5:
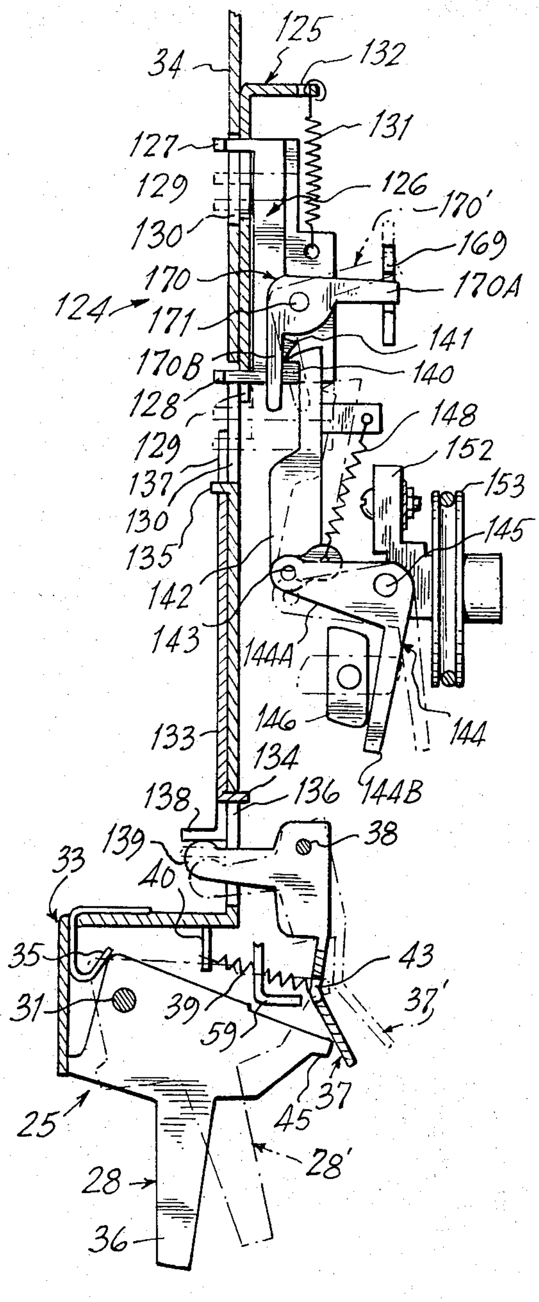
Figure 6:
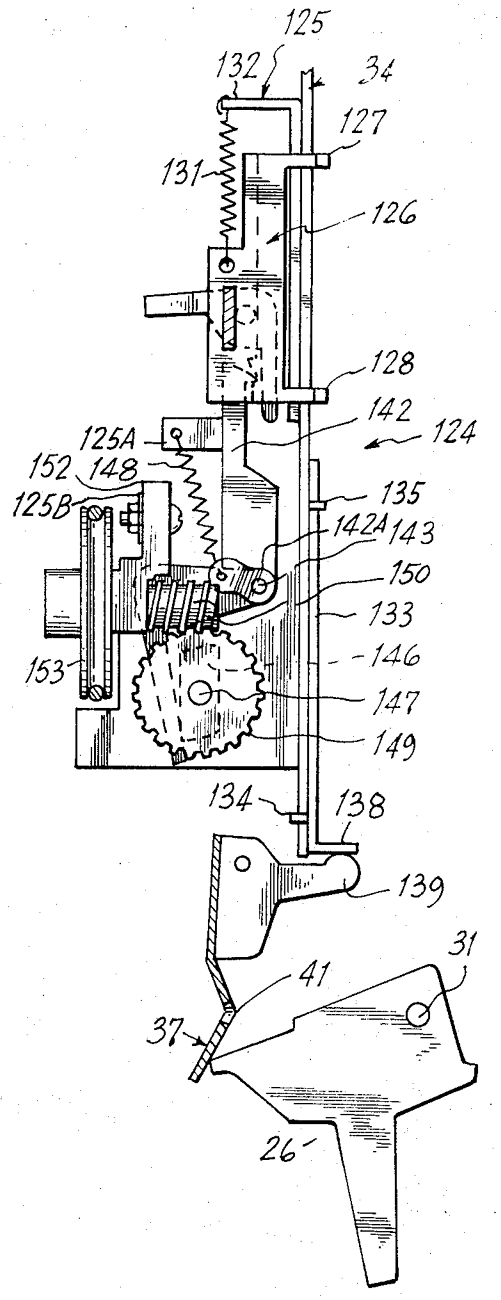
Figure 7:
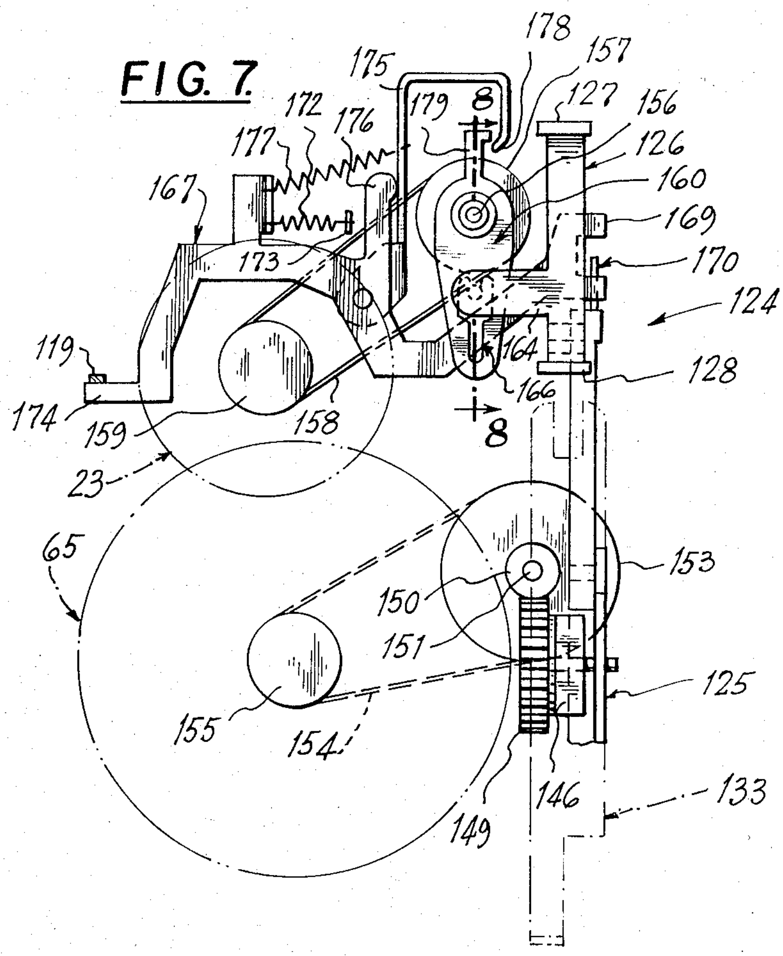
Figure 8:
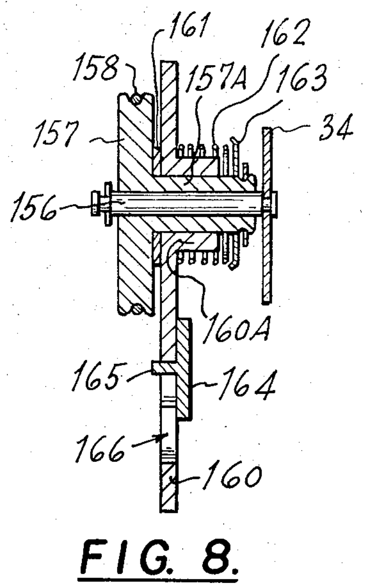
Figure 10A:
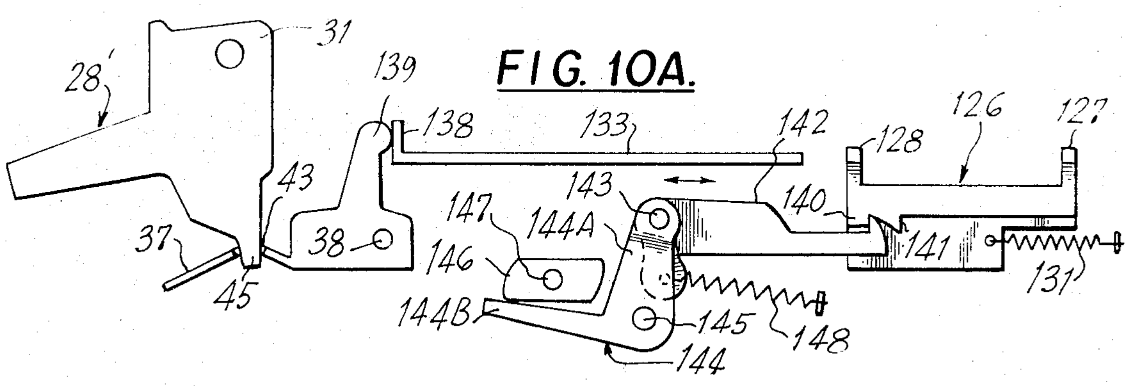
Figure 10B:
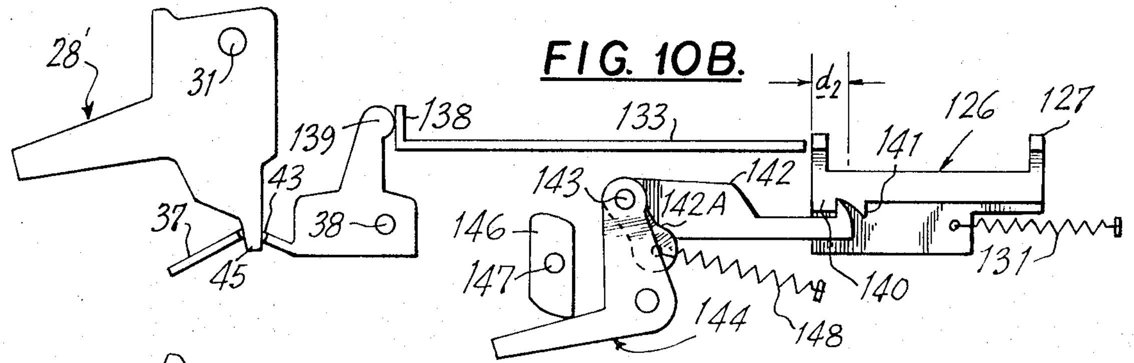
Figures 9, 10C:
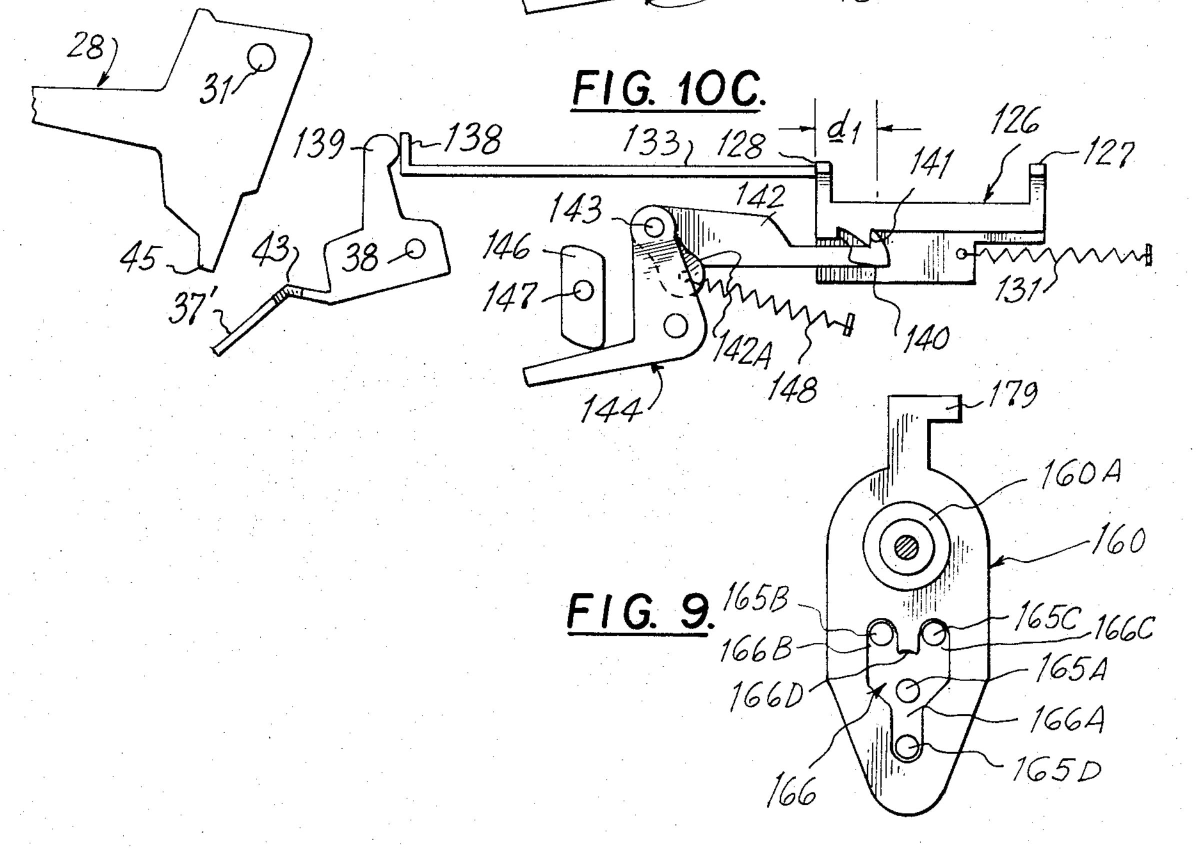

FIGS. 5 and 6 are sectional views respectively taken along the line 5—5 and the line 6—6 on FIG. 3, and which show details of the shut-off device according to this invention;

FIG. 7 is a top plan view of the shut-off device according to this invention;

FIG. 8 is a detail sectional view taken along the line 8—8 on FIG. 7;

FIG. 9 is a plan view of one of the elements included in the shut-off device; and FIGS. 10A, 10B and 10C are diagrammatic views generally similar to that of FIG. 5, and showing elements of the shut-off device at various stages of its operation.

Figure 1:
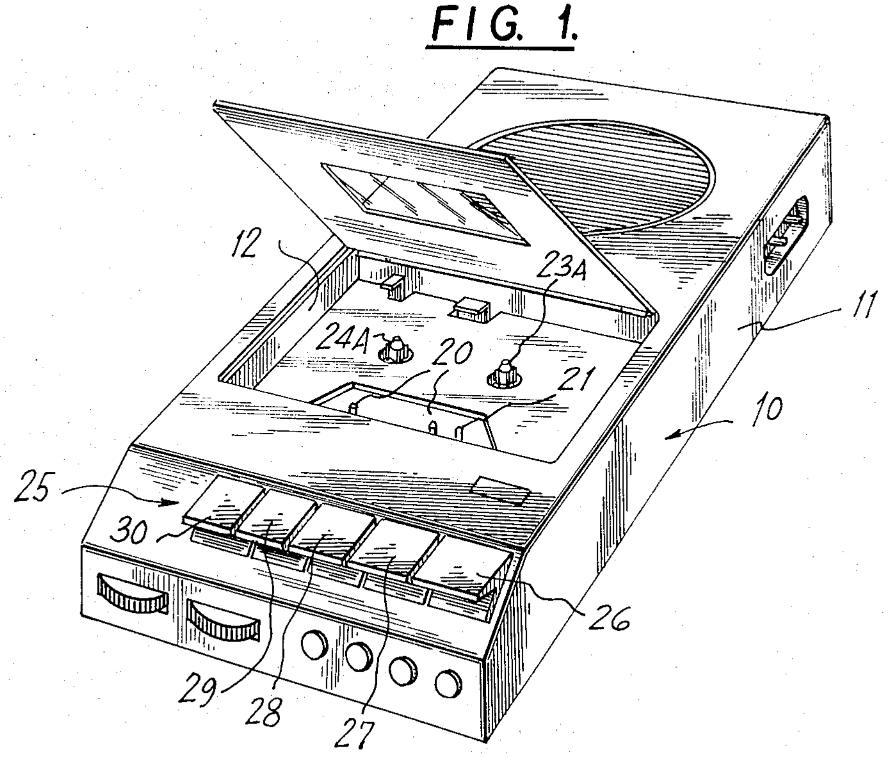
FIG. 1 is a perspective view of a magnetic recording and reproducing apparatus of a type that may be provided with an automatic shut-off device in accordance with this invention.
Figure 2:
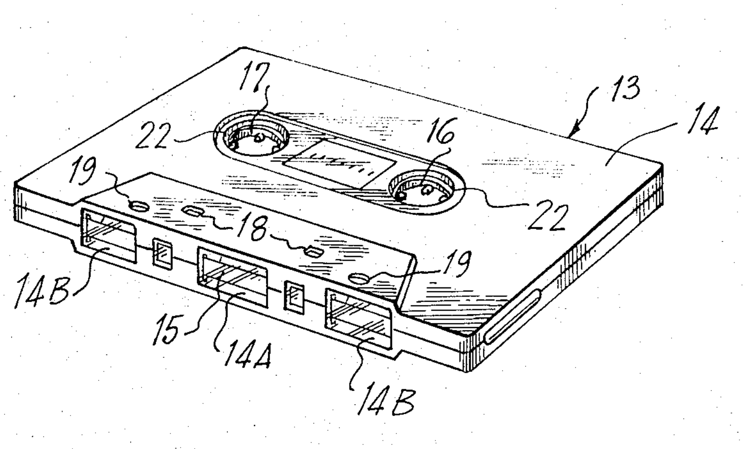
FIG. 2 is a perspective view of a conventional or standardized tape cassette that may be employed in the apparatus of FIG. 1.

Referring to the drawings in detail, and initially to FIG. 1 thereof, it will be seen that a magnetic recording and reproducing apparatus 10 of a type that may be provided with an automatic tape drive shut-off device according to this invention includes a casing 11 provided with a recess or cavity 12 for reception of a tape cassette 13 (FIG. 2).

The cassette 13 is shown to include a housing 14 containing a tape 15 which is wound on reels 16 and 17 that are freely rotatable within the housing. As is usually the case, the opposite ends of tape 15 are secured to the reels 16 and 17, respectively, and the tape extending between the reels is directed by guides (not shown) within cassette housing 14 so as to travel along the front edge wall of cassette housing 14 for exposure at openings or windows 14A and 14B provided in such front edge wall of the cassette housing. The top and bottom walls of cassette housing 14 are provided, ajacent the front edge of the housing, with a pair of laterally spaced openings 18 and a pair of further laterally spaced apart openings 19. When the cassette 13 is disposed in cavity 12 of casing 11, locating pins 20 projecting upwardly within such cavity are received in openings 18 of the cassette for precisely locating the latter and a capstan 21, also projecting upwardly within cavity 12, extends into one or the other of the openings 19 of the cassette and thus is disposed adjacent the run of magnetic tape 15 passing one of the windows 14B provided in the front edge of cassette housing 14. The top and bottom walls of cassette housing 14 are further shown to have the usual openings 22 registering with internally splined hubs of reels 16 and 17 so that, when the cassette is disposed in cavity 12, such internally splined hubs of the reels can receive and be rotatably coupled with the similarly splined rotatable reel drive shafts 23A and 24A of reel support members 23 and 24 which project upwardly into cavity 12.

The apparatus 10 is further shown to have a control assembly 25 that includes pushbuttons 26,27,28,29 and 30 that are manually actuable to select respective operating modes of apparatus 10. For example, when a cassette 13 is located within cavity 12, manual depressing of pushbutton 28 may be made effective to cause the normal or relatively slow speed advancement of the tape 15 in the forward direction, that is, in the direction unwinding the tape from supply reel 17 and winding up the tape on take-up reel 16, as during the playback or reproducing of signals previously recorded on the tape, or during the recording of signals on the tape, which recording mode of operation may be achieved by the simultaneous actuation of pushbuttons 26 and 28. Similarly, pushbuttons 27 and 30 may be made effective to control the fast forward movement and fast rewinding, respectively, of the tape, whereas the pushbutton 29 may be employed for halting the tape drive at any desired time during any of the selected operating modes of apparatus 10, all as hereinafter described in detail.

Figure 4:
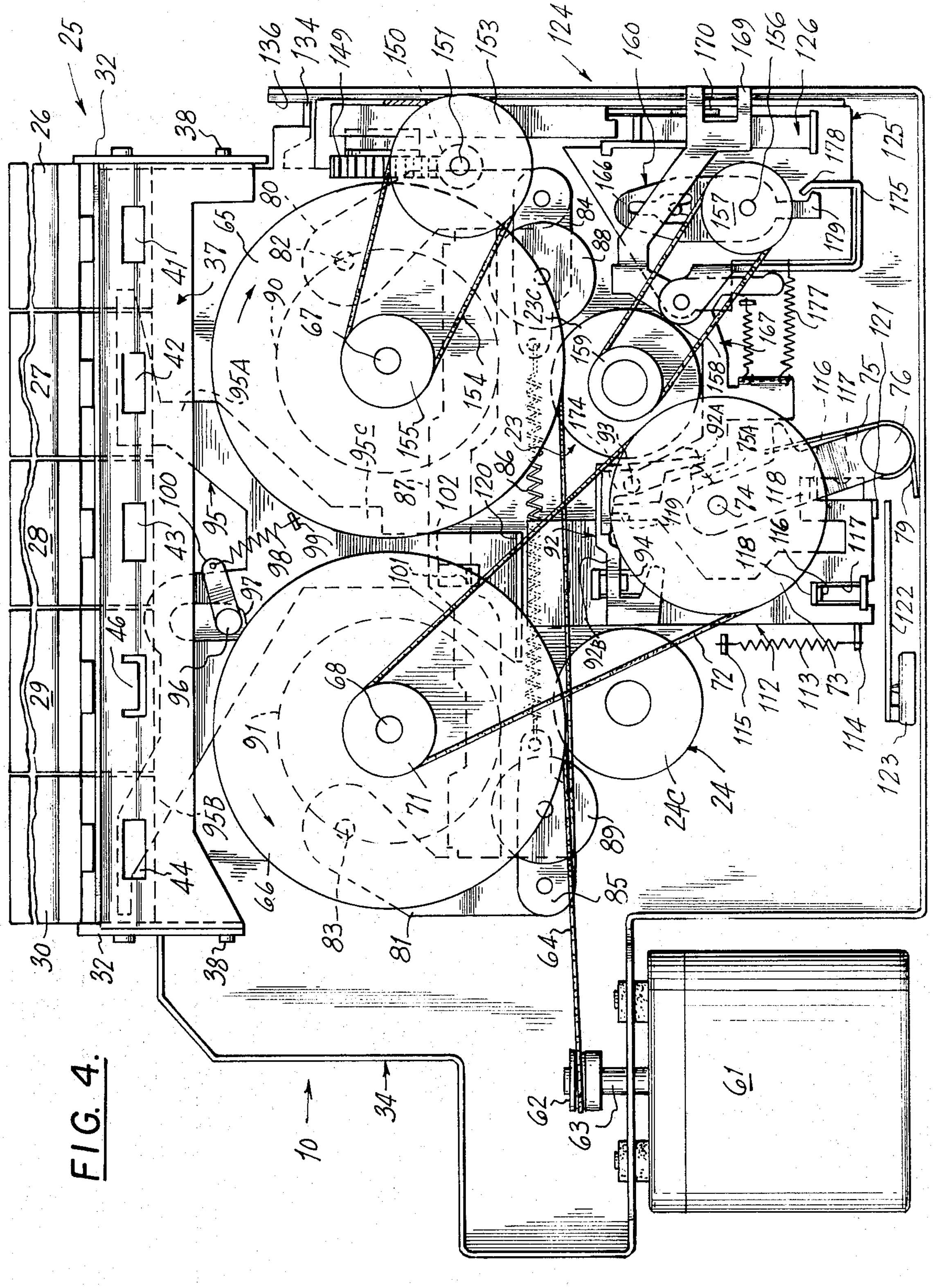
FIG. 4 is a plan view similar to that of FIG. 3, but showing the underside of the apparatus.

Referring to FIGS. 3,4 and 5, it will be seen that the mode-selecting pushbuttons 26–30 are pivotally mounted side-by-side on a shaft 31 which is supported, at its ends, in end walls 32 of a bracket 33 mounted at the front of a chassis plate 34. As shown on FIG. 5 with respect to pushbutton 28, a leaf spring 35 is carried by bracket 33 and engageable with the top of each of the pushbuttons 26–30 in back of the pivoting axis thereof so as to urge each of the pushbuttons to its normal inoperative position shown in full lines on FIG. 5 and in which the manually engageable, forwardly projecting portion 36 of the pushbutton is raised. The control assembly 25 is further shown to include a latch member 37 (FIGS. 4 and 5) which is pivotally mounted, at its ends, on pivot pins 38 carried by end walls 2β of bracket 33, and which extends forwardly under all of the pushbuttons 26–30 from the pivoting axis defined by pins 38. A spring 39 (FIG. 5) is connected between latch member 37 and a tab 40 provided on bracket 33 for urging latch member 37 upwardly to its latching position shown in full lines on FIG. 5. As shown particularly on FIG. 4, the latch member 37 is formed with laterally spaced apart slots or keepers 41,42,43 and 44 which respectively register with pushbuttons 26,27,28 and 30 and which are adapted to receive a latch element 45 depending from the respective pushbutton when such pushbutton is manually displaced or depressed to its operative position, as shown particularly on FIGS. 10A and 10B with respect to the pushbutton 28. It will be apparent that, as any one of the pushbuttons 26,27,28 and 30 is depressed or rocked to its operative position indicated in broken lines at 28′ on FIG. 5 with respect to the pushbutton 28, the respective latch element 45 rides on latch member 37 to depress the latter against the force of spring 39 until such time as the latch element 45 is received in the respective keeper slot 41–44. Thereafter, latch element 37 retains the previously depressed pushbutton in its operative position until such time as latch member 37 is rocked to its released position indicated in broken lines at 37′ on FIG. 5, whereupon any previously depressed pushbutton is free to be returned to its inoperative position by the respective spring 35.

At the location of the pushbutton 29, the latch member 37 is shown to have an upwardly inclined tab 46 struck therefrom so as to be engageable by the latch element 45 of the pushbutton 29. Thus, whenever pushbutton 29 is depressed to its operative position, the element 45 thereof engages the upwardly struck tab 46 and thereby depresses latch member 37 to its released position indicated at 37′ on FIG. 5, whereby to release the latch element 45 of any one of the other pushbuttons 26,27,28 and 30 which had been previously retained in the operative position thereof.

Referring again to FIG. 3, it will be seen that the apparatus 10 further includes a carriage 47 which is disposed on top of chassis plate 34 and guided for forward and rearward movement with respect to the latter, as by pins 48 carried by the chassis plate and received in respective slots 49 formed in carriage 47. Carriage 47 is yieldably urged in the forward direction to the inoperative position shown on FIG. 3, as by a spring 50 connected between carriage 47 and an anchor 51 projecting upwardly from chassis plate 34. An erasing head 52 and a recording and reproducing head 53 are fixed on carriage 47 so that, when a cassette 13 is disposed in cavity 12 and carriage 47 is moved rearwardly to its operative position, as hereinafter described in detail, heads 52 and 53 will be engageable with the tape 15 exposed at windows 14B and 14A, respectively, of the cassette housing. A pinch roller assembly 54 is provided on chassis plate 34 at one side of carriage 47 adjacent capstan 21 and includes a bracket 55 which rotatably supports a pinch roller 56 and which is pivotally mounted on a pin 57 extending from chassis plate 34 for movement of pinch roller 56 toward and away from capstan 21. A spring 58 is secured on carriage 47 and engages bracket 55 for holding pinch roller 56 away from capstan 21 when carriage 47 is in its forward, inoperative position, as shown, and for swinging bracket 55 so as to press pinch roller 56 against capstan 21 when carriage 47 is displaced rearwardly to its operative position. It will be apparent that when a cassette 13 is positioned in cavity 12 and carriage 47 is moved to its operative position, the tape 15 exposed at the window 14B of the cassette housing opposite to that at which erasing head 52 engages the tape will be engaged between capstan 21 and pinch roller 56 so as to be advanced thereby in response to rotation of the capstan.

In order to provide for the rearward movement of carriage 47 from its forward inoperative position to its operative position, carriage 47 is provided with a bent extension 59 (FIGS. 3 and 5) which extends forwardly and downwardly from carriage 47 through a slot 60 (FIG. 3) provided in chassis plate 34, and which terminates in back of pushbutton 28 substantially below the pivoting axis of the latter defined by shaft 31 (FIG. 5). Thus, when pushbutton 28 is depressed to its operative position indicated in broken lines at 28′ on FIG. 5, such pushbutton acts rearwardly on extension 59 of carriage 47 for displacing the latter rearwardly to its operative position at which the carriage 47 is maintained by the engagement of latch element 45 on pushbutton 28 in the respective keeper slot 43 of latch member 37.

As shown particularly on FIG. 4, a drive assembly of the apparatus 10 includes an electric motor 61 carried by chassis plate 34 and having a drive pulley 62 secured on the motor shaft 63 for driving a belt 64 which is wrapped about the grooved peripheries of a pair of fly wheels 65 and 66. The fly wheels 65 and 66 are disposed below chassis plate 34 and rotatably mounted on shafts 67 and 68, respectively, which are journalled in suitable bearings 69 and 70 (FIG. 3) carried by chassis plate 34 at locations that are spaced forwardly from reel supporting members 23 and 24. The capstan 21 projects upwardly from shaft 67 and may be an integral extension of the latter. In the illustrated drive assembly, the belt 64 is arranged with respect to the grooved fly wheels 65 and 66 so that, upon energization of motor 61, fly wheels 65 and 66 are rotated in the clockwise and counterclockwise directions, respectively, as viewed on FIG. 4.

The apparatus 10 is further shown to comprise a transmission assembly which, in accordance with the mode of operation selected by manual actuation of one of the control pushbuttons 27,28 and 30, transmits rotary movement from one of the fly wheels 65 and 66 to a selected one of the reel support members 23 and 24 for rotating the selected reel support member in the direction for winding tape on the reel of cassette 13 which is respectively coupled therewith. In the illustrated embodiment, the transmission assembly is shown to include a pulley 71 (FIG. 4) which may be integral with fly wheel 66 and is, in any case, rotatable with the latter on shaft 68 for driving a belt 72 that extends around an idler pulley 73. The idler pulley 73 is secured on the lower end of an idler shaft 74 which is journaled in the free end portion of an idler support arm 75 having its opposite end mounted on a pivot 76 depending from chassis plate 34. The upper end portion of idler shaft 74 projects upwardly through an opening 77 in chassis plate 34 (FIG. 3) and has fixed thereon an idler wheel 78 which is peripherally engageable with a disc 23B of reel support member 23 which is rotatably coupled with the respective reel drive shaft 23A. A torsion spring 79 (FIG. 4) is provided around the pivot 76 of arm 75 and urges the latter in the direction for engaging idler wheel 78 with disc 23B. When idler wheel 78 is thus engaged with disc 23B in response to the actuation of control pushbutton 28, as hereinafter described in detail, disc 23B and the respective reel drive shaft 23A are rotated in the counterclockwise direction, as viewed on FIG. 3, and such rotation of reel drive shaft 23A and of the takeup reel coupled therewith is effected at a relatively slow speed which corresponds to the speed at which the tape is being advanced by the cooperative action of capstan 21 and pinch roller 56.

As particularly shown on FIG. 4, the transmission assembly of apparatus 10 further includes a pair of laterally spaced apart levers 80 and 81 pivotally mounted against the underside of chassis plate 34, as at 82 and 83, so as to extend rearwardly from their respective pivots at the outer sides of shafts 67 and 68. Links 84 and 85 are pivotally connected to the free ends of levers 80 and 81, respectively, and are urged inwardly toward each other by a connecting tension spring 86. A laterally movable slide 87 extends between levers 80 and 81 and engages the latter at its opposite ends so as to maintain levers 80 and 81 in a predetermined spaced relation against the urging of spring 86. Links 84 and 85 respectively carry freely rotatable idler wheels 88 and 89 which are alternately operable to transmit rotary movement from fly wheel 65 to reel support member 23 and from fly wheel 66 to reel support member 24, respectively. More specifically, idler wheel 88 is normally spaced from, but is selectively engageable with the peripheries of a drive wheel 90 secured on shaft 67 immediately above fly wheel 65 and with a driven wheel 23C of reel support member 23 which is located below chassis plate 34 and suitably coupled with the respective disc 23B and reel drive shaft 23A, as by a conventional friction clutch (not shown). Similarly, idler wheel 89 is normally spaced from, but is selectively engageable with the peripheries of a drive wheel 91 fixed on shaft 68 immediately above fly wheel 66 and a driven wheel 24C of reel support member 24 which is rotatably coupled, as through a friction clutch, with the respective reel drive shaft 24A and disc 24B located above chassis plate 34. When idler wheel 88 is engaged with drive wheel 90 and driven wheel 23C in response to the actuation of control pushbutton 27, as hereinafter described in detail, the transmission assembly is effective to cause relatively high speed rotation of reel drive shaft 23A and the reel of cassette 13 coupled therewith in the counterclockwise direction as viewed on FIG. 3 for achieving the fast forward movement or winding of the tape on the takeup reel. On the other hand, when idler wheel 89 is engaged with drive wheel 91 and driven wheel 24C in response to the actuation of control pushbutton 30, as hereinafter described in detail, the transmission assembly is effective to cause the high speed rotation of reel drive shaft 24A and the reel of cassette 13 coupled therewith in the clockwise direction as viewed on FIG. 3 for achieving the high speed rewinding of the tape on the supply reel.

In order to provide for control of the operations of the above-described transmission assembly in accordance with the selective actuation of control pushbuttons 27, 28 and 30, the apparatus 10 is shown to include an idler disengaging lever 92 which is mounted below chassis plate 34 on a pivot pin 93 (FIG. 4) and which has angularly related arms 92A and 92B respectively extending rearwardly and laterally from the pivoting axis. The arm 92A is engageable with a nose 75A formed on idler support arm 75, and the arm 92B is engageable by an abutment or lug 94 which depends from the back end of carriage 47 through a slot 95 provided in chassis plate 34 so as to be disposed in back of arm 92B. Thus, when carriage 47 is urged by spring 51 to its forward, inoperative position, lug 94 rocks lever 92 in the clockwise direction, as viewed on FIG. 4, and arm 92A acts against nose 75A to pivot arm 75 in the counterclockwise direction against the force of spring 79, and thereby holds idler wheel 78 (FIG. 3) away from disc 23B of reel support member 23. However, when carriage 47 is moved rearwardly to its operative position in response to actuation of control pushbutton 28, as previously described, the corresponding movement of lug 94 permits lever 92 to turn in the counterclockwise direction, as viewed on FIG. 4, so that arm 92A moves away from nose 75A and spring 79 can then turn arm 75 to effect engagement of idler wheel 78 with disc 23B. It will be apparent from the foregoing that the transmission assembly is controlled to effect the relative slow rotation of reel support member 23 and of the reel engaged therewith for normal forward movement of the tape whenever pushbutton 28 is actuated, for example, when it is desired to achieve either reproducing or recording operations of apparatus 10.

For controlling the operations of the transmission assembly, the apparatus 10 further includes a generally Y-shaped control member 95 (FIG. 4) disposed against the underside of chassis plate 34 and being movably mounted with respect to the latter by means of a pin 96 depending from chassis plate 34 and engaging loosely in a slot 97 formed in control member 95. The Y-shaped control member 95 is shown to include forwardly diverging arm portions 95A and 95B which are respectively engaged with the back surfaces of control pushbuttons 27 and 30 below the pivoting axis of the pushbuttons by the action of the tension spring 98 connected between a lug 99 extending from control member 95 and an anchor 100 provided on pin 96 for yieldably urging control member 95 in the forward direction. Control member 95 is further shown to include a rearwardly directed stem portion 95C having a tab or lug 101 projecting therefrom and engaging in a slot 102 provided in laterally movable slide 87.

It will be apparent that actuation of control pushbutton 27 will cause rearward displacement of arm portion 95A of member 95 whereby to angularly displace the latter in the clockwise direction as viewed on FIG. 4 about an axis defined by the point of engagement of the other arm portion 95B with pushbutton 30, so that lug 101 is displaced toward the left, and causes similar lateral displacement of slide 87. By reason of such displacement of slide 87, lever 81 and idler wheel 89 are removed to the left as viewed on FIG. 4 for further spacing idler wheel 89 from the respective wheels 91 and 24C, and spring 86 urges lever 80 and idler wheel 88 to also move to the left to the extent permitted by the displacement of slide 87 so that idler wheel 88 engages the peripheries of wheels 90 and 23C. Thus, reel support member 23 is rotated at a relatively high speed in the counterclockwise direction as viewed on FIG. 3, thereby to effect the fast forward movement of the tape within the cassette. Conversely, when control pushbutton 30 is actuated, the action of that pushbutton on arm portion 95B of control member 95 causes the latter to turn in the counterclockwise direction as viewed on FIG. 4, and thereby causes displacement of lug 101 and slide 87 toward the right from the position shown on FIG. 4. By reason of such rightward displacement of slide 87, idler wheel 88 is moved further away from the respective wheels 90 and 23C, and idler wheel 87 is moved into engagement with wheels 91 and 24C so as to effect the high speed rotation of reel support member 24 in the clockwise direction, as viewed on FIG. 3, for causing the high speed rewinding of the tape on the respective reel. Of course, when both control pushbuttons 27 and 30 are in their inoperative positions, control member 95 remains in its neutral position shown on FIG. 4, and, by reason of such neutral positioning of control member 95, idler wheels 88 and 89 are held spaced from the wheels 90 and 24C and the wheels 91 and 24C, respectively.

It will be apparent that, following the actuation of any one of the control pushbuttons 27, 28, and 30 for conditioning the transmission assembly to achieve the respective driving condition, the actuated control pushbutton will be retained in its operative position for maintaining the selected driving condition by the previously described action of the latch member 37 until such time as the latter is released, for example, by actuation of the manual "stop" pushbutton 29.

As previously noted, the actuation of pushbutton 28 to its operative position may be relied upon not only to condition the transmission assembly for the normal forward movement of the tape, but also to condition electrical circuits (not shown) associated with the head 53 so that such head is operative to reproduce signals previously recorded on the tape. When it is desired to record signals on the tape during the normal forward movement of the latter, the pushbuttons 26 and 28 are simultaneously actuated to their operative positions and, in that case, the pushbutton 28 again conditions the transmission assembly for the normal forward movement of the tape while the actuated pushbutton 26 conditions the electrical circuits (not shown) associated with head 53 so that the latter is then operative to record signals on the tape.

As shown on FIG. 3, the apparatus 10 further preferably includes a brake assembly 103 constituted by a brake support arm 104 extending laterally above chassis plate 34 in back of reel support members 23 and 24. Frictional brake elements 105 and 106 are carried by the opposite ends of arm 104 and are engageable with the peripheries of discs 23B and 24B for braking the rotational movements of the respective reel support members 23 and 24. A leaf 107 has its ends bearing against lugs 108 projecting upwardly from chassis plate 34, and the center of leaf spring 107 bears against an abutment 109 formed on brake support arm 104 in the forward direction for engaging brake elements 105 and 106 with the respective discs 23B and 24B. The brake support arm 104 further has a centrally located slot 110 which receives a pin 111 extending from plate 34 for guiding arm 104 in its movements relative to the chassis plate.

In order to effect the release of brake assembly 103 for each of the selected modes of operation of apparatus 10, the latter includes a brake release slide 112 which is slidably mounted at the underside of chassis plate 34 and which is urged forwardly by a tension spring 113 extending between a tab 114 on slide 112 and an anchor 115 on plate 34. The brake support arm 104 has lugs 116 depending therefrom through slots 117 in plate 34 (FIG. 4) and being engageable by abutting surfaces 118 on slide 112. Thus, when slide 112 is moved rearwardly from the position shown on FIG. 4, lugs 116 and brake support arm 104 are similarly displaced rearwardly by disengaging brake elements 105 and 106 from the respective discs 23B and 24B.

In order to effect the rearward displacement of brake release slide 112 upon the actuation of the "forward" control pushbutton 28, that is, upon the selection of the reproducing or recording modes of operation of apparatus 10, slide 112 is provided with a lug 119 disposed in back of the arm 92B of lever 92 so that, when carriage 47 moves rearwardly to its operative position in response to actuation of pushbutton 28 and thereby permits turning of lever 92 in the counterclockwise direction as viewed on FIG. 4, slide 112 is displaced rearwardly to release the brake assembly.

In order to provide for the release of the brake assembly during the fast forward or rewinding modes of operation of apparatus 10, that is upon the actuation of pushbutton 27 or pushbutton 30, respectively, the forward end of slide 112 extends adjacent to a laterally directed flange 120 provided along the end of stem portion 95C of Y-shaped control member 95. Thus, when control member 95 is angularly displaced in one direction or the other by the actuation of pushbutton 27 or pushbutton 30, the flange 120 acts rearwardly against the adjacent forward end of slide 112 for displacing the latter rearwardly and thereby causing release of the brake assembly.

Whenever brake release slide 112 is displaced rearwardly to effect the release of brake assembly 103, as described above, a tab 121 extending from the back end of slide 112 engages and displaces an actuating arm 122 of a switch 123 for closing the normally open contacts of such switch and thereby effecting energization of the drive motor 61. Thus, whenever one of the control pushbuttons 27, 28, or 30 is actuated to select the corresponding mode of operation of apparatus 10, the motor 61 of the drive assembly is made to operate and continues to operate so long as the actuated control pushbutton is retained in its operative position by latch member 37.

In accordance with the present invention, the above-described recording and reproducing apparatus 10 is provided with an automatic shut-off device 124 by which the operation of motor 61 of the drive assembly is halted upon the full unwinding of the tape from one of the reels 16 and 17 coupled rotatably with the reel support members 23 and 24. As shown particularly on FIGS. 4 – 7, the shutoff device 124 according to the illustrated embodiment of this invention comprises a frame or bracket 125 suspended from chassis plate 34 adjacent one side of the latter. The bracket 125 supports a reciprocable member or slide 126 having T-shaped, upwardly directed extensions 127 and 128 which are slidably received in suitable slots 129 in bracket 125 and which extend upwardly through corresponding slots 130 in plate 34. The reciprocable member or slide 126 is urged rearwardly to an initial position shown in full lines on FIG. 5 and on FIG. 6, as by a tension spring 131 connected between slide 126 and an anchor tab 132 on bracket 125. The slide 126 is displaceable forwardly from such initial position to a predetermined extent indicated at $d_1$ on FIG. 10C. A latch release member 133 is mounted on top of chassis plate 34 in front of reciprocable member or slide 126 and is guided for longitudinal movement with respect to plate 34, as by projections 134 and 135 which are slidably received in respective slots 136 and 137. A lug 138 is formed at the forward end of latch release member 133 and is engageable against an arm 139 which projects upwardly from the adjacent end of latch member 37. The latch release member 133 is longitudinally dimensioned so that, when slide 126 is displaced forwardly to the predetermined extent $d_1$ to the position shown on FIG. 10C from its initial position shown on FIG. 10A, the extension 128 of slide 126 engages the back end of latch release member 133 and propels the latter forwardly so that lug 138 acts on arm 139 to rock latch member 37 to its released position indicated at 37' on FIG. 10C and in broken lines on FIG. 5.

Although the slide 126 and latch member 133 are separate engageable elements in the illustrated embodiment of the invention, such elements may be formed integrally to cause the lug 138 to engage arm 139 for releasing latch member 37 only in the event that slide 126 and member 133, when formed integrally or as a unit, are displaced forwardly from the initial position to the predetermined extent $d_1$.

In accordance with the present invention, the power for displacing or driving the slide 126 to the predetermined extent $d_1$ from its initial position shown on FIG. 10A is derived from the drive assembly of apparatus 10 and the displacement to such predetermined extent $d_1$ occurs only when the rotation of reel support members 23 and 24 is arrested during the continued operation of the drive assembly. More particularly, the slide 126 is shown to have downwardly facing teeth 140 and 141 (FIGS. 5 and 10A – 10C) selectively engageable by a pawl member 142 which is pivotally mounted at 143 on an upstanding arm 144A of an L-shaped lever 144. The lever 144 is rockably mounted, intermediate its ends, on a pivot 145 carried by bracket 125, and the horizontally directed arm 144B of lever 144 extends under a cam member 146 which is rotatably mounted on a shaft 147 also carried by bracket 125. An arm 142A depends from pawl member 142 and is connected to a tension spring 148 which extends rearwardly therefrom to an anchor tab 125A on bracket 125 (FIG. 6) so that the spring 148 urges lever 144 to rock in the clockwise direction, as viewed on FIGS. 5 and 10A – 10C, and further urges pawl member 142 upwardly for engagement with teeth 140 and 141. A worm gear 149 is also provided on shaft 147 and may be formed integral with cam 146 or otherwise rotatably coupled with the latter. The worm gear 149 (FIGS. 4, 6 and 7) meshes with a worm 150 that is secured on a shaft 151 journaled in a bearing block 152 carried by a tab portion 125B of bracket 125. Also secured on shaft 151 is a pulley 153 which is engaged by a belt 154, and the latter is driven by a pulley 155 fixed relative to fly wheel 65 on shaft 67. Thus, so long as drive motor 61 is energized in response to the closing of the contacts of switch 123, cam 146 is rotated and, by reason of the engagement of the arm 144B of lever 144, with cam 146, lever 144 is oscillated about its pivot 145 to effect reciprocation of pawl member 142. The cam 146 is dimensioned so that the reciprocation of pawl member 142, and hence of slide 126, has a stroke length $d_2$ (FIG. 10B) which is smaller than the predetermined displacement $d_1$ (FIG. 10C) of slide 126 that is required to effect the release of latch member 37.

It will be seen from FIG. 10A that, with slide 126 in its rearmost or initial position to which it is urged by spring 131, and with pawl member 142 also in its rearmost position, pawl member 142 engages tooth 140 of the slide so that, when pawl member 142 is moved forwardly to the full limit of its stroke, as on FIG. 10B, slide 126 is moved forwardly only through the distance $d_2$ from its initial position, and thus does not cause latch release member 133 to effect the release of latch member 37. However, when pawl member 142 is engaged with tooth 141 on slide 126, as shown on FIG. 10C, the forward stroke of pawl member 142 through the distance $d_2$, is effective to move slide 126 to a predetermined extent $d_1$ from its initial position so that member 133 is then displaced forwardly to effect release of latch member 37. For each of the operating modes of apparatus 10, and so long as tape is still wound on each of the reels in the cassette, pawl member 142 engages tooth 140 of slide 126 so that the latter is reciprocated between the positions shown on FIGS. 10A and 10B, respectively, to avoid displacement of latch member 37 from its operative or latching position. However, when, during any one of the operating modes of apparatus 10, the rotation of reel support members 23 and 24 is arrested while the operation of drive motor 61 continues, for example, when the tape is completely unwound from one or the other of the reels in the cassette, the rearward return of slide 126 to its initial position shown on FIG. 10A from the position shown on FIG. 10B is blocked or limited at an intermediate position therebetween so that, as pawl member 142 completes its rearward or return stroke, the pawl member 142 is disengaged from tooth 140 and engaged with tooth 141 on slide 126. Thereafter, during the subsequent forward stroke of pawl member 142 with the latter engaged with the tooth 141, slide 126 is moved to the position shown on FIG. 10C and thereby causes displacement of latch member 37 to its released position.

As shown particularly on FIGS. 7 and 8, the mechanism in shut-off device 124 for selectively blocking or limiting the return movement of slide 126 in the rearward direction to its initial position when the rotation of reel support members 23 and 24 is arrested includes an axle 156 depending from chassis plate 34 and having a pulley 157 with a hub 157A freely rotatable thereon. The pulley 157 is driven by way of a belt 158 from a drive pulley 159 which is rotatably coupled with one of the rotatable reel support members, for example, with the reel support member 23, as shown (FIGS. 4 and 7). An elongated plate 160 is formed with a hollow hub 160A adjacent one end which is freely slidable on the hub 157A of pulley 157, and a frictional ring 161 extends around hub 157A between plate 160 and pulley 157. A helical compression spring 162 extends around hub 160A between a retaining ring 163 and plate 160 for urging the latter downwardly toward pulley 157, whereby plate 160 is frictionally urged to turn with pulley 157. An arm 164, which may be integral with slide 126 or otherwise joined to the latter, extends laterally inward from slide 126 above friction plate 160 and carries a depending pin or abutment 165 which is slidably received in a substantially Y-shaped slot 166 formed in friction plate 160. As shown particularly on FIG. 9, the slot 166 includes a forwardly directed stem portion 166A and branched arm portions 166B and 166C which diverge rearwardly from stem portion 166A to define a forwardly facing stop member 166D between branched arm portions 166B and 166C.

During rotation of reel support member 23, the frictional coupling of plate 160 to rotated pulley 157 causes plate 160 to be urged angularly towards one side or the other of the centered position thereof shown on FIGS. 7 and 9. Thus, so long as reel support member 23 is rotated, the reciprocation of slide 126 between the position shown on FIGS. 10A and 10B is accompanied by the movement of pin or abutment 165 between the position indicated at 165A on FIG. 9, in the entry of stem portion 166A, and either the position indicated at 165B or the position indicated at 165C within the arm portion 166B or the arm portion 166C, respectively, of the slot. The foregoing results from the fact that, so long as reel support member 23 continues to rotate, one side or the other of slot 166 is urged against pin 165 so that the latter will enter one or the other of arm portions 166B and 166C, in moving rearwardly with slide 126 from the position of the latter shown on FIG. 10B to the initial position of the slide shown on FIG. 10A. However, when the rotation of reel support member 23 is arrested so that pulley 157 is no longer rotated, the forward movement of slide 126 to the position shown on FIG. 10B, and the consequent movement of the pin or abutment 165 to the position indicated at 165A on FIG. 9, causes the return of plate 160 to its centered position and, during the following rearward movement of pin 165 with slide 126, plate 160 remains in its centered position, as shown on FIG. 9, to interpose stop member 166D in the path of rearward movement of pin 165. Therefore, stop member 166D blocks the rearward or return movement of slide 126 at the previously mentioned intermediate position so as to cause the disengagement of pawl member 142 from tooth 140 and the engagement of the pawl member with tooth 141. Thereafter, during the next forward stroke of pawl member 142, slide 126 is moved forwardly to the position shown on FIG. 10C for effecting release of latch member 137, with the pin 165 then moving forwardly along stem portion 166A of slot 166, for example, to the position indicated at 165D on FIG. 9.

The apparatus 10 is further shown to include a shut-off release lever 167 which extends generally laterally below chassis plate 34 and which is pivotally mounted, intermediate it ends, on a pivot pin 168 depending from the chassis plate (FIGS. 4 and 7). The outer end portion of lever 167 is bifurcated, as at 169, and extends below slide 126 to embrace the downwardly directed arm 170A of an L-shaped pawl-release lever 170. The pawl-release lever 170 is pivotally mounted on a pin 171 carried by bracket 125, and the forwardly directed arm 170B of lever 170 extends above the nose of pawl member 142. Thus, when lever 170 is turned in the counterclockwise direction, as viewed on FIG. 5, from the position shown in full lines to the position indicated in broken lines at 170', lever arm 170B depresses pawl member 142 and thereby releases the latter from the teeth of slide 126 to permit the return of the latter to its initial position by means of spring 131.

A spring 172 is connected between lever 167 and an anchor 173 provided on chassis plate 34 for urging lever 167 to turn in the clockwise direction as viewed on FIG. 7, that is, to move the bifurcated end portion 169 of lever 167 in the forward direction, and thereby to move pawl release lever 170 to its inoperative position shown in full lines on FIG. 5. As shown on FIGS. 4 and 7, the inner end 174 of lever 167 extends in front of the lug 119 on brake release slide 112. Thus, when brake release slide 112 is moved forwardly to its inoperative position shown on FIG. 4, for example, in response to the return of the carriage 47 to its inoperative position shown on FIG. 3 or in response to the return of control member 95 to its inoperative position shown on FIG. 4, lug 119 acts on lever 167 to turn the latter in the counterclockwise direction, as viewed on FIG. 7, that is, to rearwardly displace the bifurcated end portion 169 rearwardly for rocking pawl-release lever 170 to the position 170' on FIG. 5 and thereby disengaging pawl member 142 from slide 126.

In order to ensure that the stop member 166D of plate 160 does not interfere with the full return of slide 126 to its initial position upon the above-mentioned release of pawl member 142 from the teeth of slide 126, a generally L-shaped arm 175 is pivotally mounted, at one end, on pivot pin 168 (FIG. 7) and is urged against an abutment finger 176 on lever 167, as by a spring 177, so as to move with the lever 167. The free end 178 of arm 175 extends adjacent to an extension 179 formed on plate 160. Thus, when lever 167 is turned in the counterclockwise direction, as viewed on FIG. 7, to cause the disengagement of pawl member 142 from slide 126, as described above, the end 178 of arm 175 simultaneously acts on extension 179 of plate 160 to urge the latter to turn in the counterclockwise direction so that the pin or abutment 165 enters the arm portion 166B of slot 166 and avoids engagement with stop member 166D which would interfere with the full return of slide 126 to its initial position.

The above-described apparatus 10 having the shut-off device 124 in accordance with this invention operates as follows:

NORMAL FORWARD MODE OF OPERATION (FOR RECORDING OR REPRODUCING)

When control push button 28 is depressed for selecting the reproducing or playback mode of operation, or when pushbuttons 28 and 26 are simultaneously depressed for selecting the recording mode of operation, the latch element 45 of each depressed pushbutton is engaged in the respective keeper slot of latch member 37 and thus each actuated pushbutton is locked in its operative position. In being moved to its operative position, the pushbutton 28 acts on extension 59 of carriage 47 for moving the latter rearwardly to its operative position. The movement of carriage 47 to its operative position causes heads 52 and 53 on the carriage to be disposed against the magnetic tape in a cassette 13 positioned in cavity 12 with its reels 16 and 17 rotatably coupled with reel drive shafts 23A and 24A. Further, the movement of carriage 47 to its operative position displaces pinch roller 56 toward capstan 21 for engagement with the magnetic tape therebetween.

The rearward movement of carriage 47 to its operative position, and the consequent rearward movement of lug 94 thereon, frees the idler disengaging lever 92 so that idler support arm 75 can be turned by spring 79 to engage idler wheel 78 with disc 23B of reel support member 23. The turning of arm 75 by spring 79 causes turning of lever 92 in the counterclockwise direction, as viewed on FIG. 4, so that arm 92B of such lever acts rearwardly against lug 119 of brake release slide 112 for rearwardly displacing the latter. Such rearward displacement of slide 112 is transmitted through lugs 116 to brake support arm 104 for disengaging brake elements 105 and 106 from the respective discs 23B and 24B of the reel support members. Further, the rearward displacement of slide 112 causes tab 121 thereon to displace actuating arm 122 for closing the contacts of switch 123 and thereby causing energization of the drive motor 61. The rearward movement of lug 119 with slide 112 also permits spring 172 to turn lever 167 in the clockwise direction, as viewed on FIG. 7, whereby lever 170 is disengaged from pawl member 142 to permit engagement of the latter with tooth 140 of slide 126.

The operation of drive motor 61 causes rotation of fly wheels 65 and 66 in the clockwise and counterclockwise directions, respectively, as viewed on FIG. 4. The rotation of pulley 65 is transmitted through shaft 67 to capstan 21, and the rotation of fly wheel 66 is transmitted through pulleys 71 and 73 and belt 72 to shaft 74 for turning idler wheel 78 which, in turn, turns reel support member 23. Thus, capstan 21 and pinch roller 56 cooperate to drive the tape in the forward direction at the normal speed for reproducing or recording and reel support member 23 turns the take-up reel of the cassette in the direction for winding the tape thereon. The rotation of fly wheel 65 is transmitted through pulleys 153 and 155 and belt 154 to effect rotation of shaft 151 and, through meshing worm gear 149 and worm 150, to effect rotation of cam 146, whereby lever 144 is oscillated and pawl member 142 engaged with tooth 140 of slide 126 causes reciprocation of the latter between the positions shown on FIGS. 10A and 10B. The rotation of reel support member 22 is transmitted through pulley 159 and belt 158 to pulley 157 so as to frictionally urge plate 160 to turn in the clockwise direction, as viewed on FIG. 7. Thus, the pin or abutment 165 tends to hug or be engaged by the right-hand side edge of slot 166, as viewed on FIG. 9, and moves in and out of the arm portion 166C of slot 166 so that stop member 166D does not interfere with the rearward return of slide 126 to its initial position shown on FIG. 10A. As previously mentioned, the forward movement of slide 126 from its initial position to the position shown on FIG. 10B, as during the normal reciprocation of slide 126, does not cause latch release member 133 to effect the release of latch member 37. Thus, the apparatus 10 continues to operate in its normal forward mode for either reproducing or recording signals on the tape.

AUTOMATIC SHUT-OFF DURING THE NORMAL FORWARD MODE OF OPERATION

When the tape is completely unwound from the supply reel rotatably coupled with reel support member 24, further rotation of reel support members 23 and 24 is halted by reason of the attachment of the end of the tape to the supply reel. By reason of the frictional clutch contained in reel support member 23 and/or by reason of the slippage of belt 72 relative to pulleys 71 and 73, the drive assembly can continue to operate, that is, fly wheel 65 can continue to rotate to effect rotation of cam 146 and the consequent oscillation of lever 144, after rotation of reel support members 23 and 24 has been arrested. However, when rotation of reel support member 23 is arrested, pulley 157 is at rest and plate 160 remains in its centered position as slide 126 is returned from the position shown on FIG. 10B toward its initial position shown on FIG. 10A. Therefore, pin or abutment 165 is engaged by stop member 166D to prevent full return of slide 126 to its initial position and the rearward stroke of pawl member 142 causes its disengagement from tooth 140 and its engagement with tooth 141 of slide 126. Thereafter, during the following forward stroke of pawl member 142, slide 126 is displaced forwardly to the position shown on FIG. 10C for forwardly displacing latch release member 133 and thereby causing the movement of latch member 37 to its released position shown at 37' on FIG. 10C. Thus, control pushbutton 28, in the case of the reproducing mode of operation, and also control pushbutton 26 in the case of the recording mode of operation is released for return by spring 35 to the inoperative position thereof.

The return of pushbutton 28 to its inoperative position permits spring 50 to return carriage 47 forwardly to the inoperative position of the latter. The forward movement of carriage 47 to its inoperative position disengages heads 52 and 53 from the tape and moves pinch roller 56 away from capstan 21 for disengaging the tape therebetween. The forward movement of carriage 47 to its inoperative position further causes its lug 94 to turn idler disengaging lever 92 in the clockwise direction, as viewed on FIG. 4, so that idler support arm 75 is angularly displaced for moving idler wheel 78 away from disc 23B of reel support member 23. Such turning of lever 92 moves its arm 92B forwardly away from lug 119 on brake release slide 112 so that spring 113 is effective to move slide 112 in the forward direction, whereby spring 107 can urge brake support arm 104 forwardly for engaging brake elements 105 and 106 with reel support members 23 and 24. The forward movement of brake release slide 112 also moves its lug 121 forwardly away from actuating arm 122 so that the contacts of switch 123 return to their normally open condition for de-energizing drive motor 61. The forward movement of lug 119 with brake release slide 112 causes turning of lever 167 in the counterclockwise direction, as viewed on FIG. 7, and the consequent rearward displacement of bifurcated end portion 169 of lever 167 turns lever 170 in the counterclockwise direction, as viewed on FIG. 5, for disengaging latch member 142 from tooth 141 of slide 126. The arm 175 is urged by spring 177 to turn, with lever 167 in the counterclockwise direction, as viewed on FIG. 7, so that end 178 of arm 175 acts against extension 179 of plate 160 for urging the latter in the counterclockwise direction, as viewed on FIG. 7. Thus, upon the release of pawl member 142 from tooth 141 of slide 126, spring 131 is effective to return slide 126 to its initial position shown on FIG. 10A and pin or abutment 165 enters arm portion 166B of slot 166 and avoids engagement with stop member 166D. Accordingly, all of the elements of apparatus 10 are returned to their original positions.

FAST FORWARD MODE OF OPERATION

When pushbutton 27 is actuated to select the fast forward mode of operation, its latch element 45 is engaged in the respective keeper slot 42 of latch member 37 to retain pushbutton 27 in its operative position. In moving to its operative position, pushbutton 27 acts on arm portion 95A of control member 95 for angularly displacing or skewing the latter in the clockwise direction, as viewed on FIG. 4, and such movement of control member 95 causes lateral displacement of slide 87 toward the left so that idler wheel 88 is moved into engagement with drive wheels 90 and 23C for transmitting rotation of fly wheel 65 to reel support member 23. The described skewing of control member 95 causes its flange 120 to effect rearward displacement of brake release member 112 so that, as previously described, brake elements 105 and 106 are disengaged from discs 23B and 24B of reel support members 23 and 24, and switch 123 is actuated to close its contacts and effect operation of drive motor 61. Thus, reel drive shaft 23A is rotated at relatively high speed in the direction for winding the tape on the take-up reel coupled therewith, that is, in a direction for fast forward movement of the tape. Since carriage 47 remains in its forward, inoperative position, heads 52 and 53 are held away from the tape and pinch roller 56 is maintained in spaced relation to the capstan 21 during the fast forward movement of the tape.

AUTOMATIC SHUT-OFF DURING FAST FORWARD MODE OF OPERATION

During the fast forward movement of the tape, and for so long as tape is being unwound from the supply reel coupled with reel drive shaft 24A, the rotation of reel support member 23 causes frictional urging of plate 160 in the clockwise direction, as viewed on FIG. 7, and the rotation of cam member 146 from fly wheel 65 results in reciprocation of slide 126 between the positions shown on FIGS. 10A and 10B. However, when the tape is completely unwound from the supply reel coupled with reel drive shaft 24A, the rotation of reel drive shafts 23A and 24A is halted with slippage occurring in the frictional clutches embodied in the respective reel support members. Thus, although the drive assembly continues to operate to effect rotation of cam member 146, plate 160 is no longer urged in the clockwise direction, as viewed on FIG. 7, so that stop member 166D of plate 160 blocks the return of slide 126 to its initial position shown on FIG. 10A and pawl member 142 comes into engagement with tooth 141 of slide 126. As before, after engagement of pawl member 142 with tooth 141, the next forward stroke of the pawl member effects a movement of slide 126 to the position shown on FIG. 10C to cause latch release member 133 to release latch member 37 from the latch element 45 of pushbutton 27 and thereby permit the return of the latter to its inoperative position. Such return of pushbutton 27 to its inoperative position permits spring 98 to return control member 95 to its inoperative position shown on FIG. 4. The return of control member 95 to its inoperative position permits spring 113 to move brake release slide 112 forwardly, whereby the contacts of switch 123 can return to their normal open condition for de-energizing drive motor 61 and brake arm 104 can be moved forwardly by spring 107 for engaging brake elements 105 and 106 with reel support members 23 and 24.

As in the above description of the automatic shut-off during the normal forward mode of operation, the forward movement of latch release slide 112 causes its lug 119 to act on lever 167 so that the latter actuates lever 170 for releasing pawl member 142 from slide 126, and, simultaneously, arm 175 acts on plate 160 so that the pin or abutment 165 enters arm portion 166B of slot 166 to avoid interference of stop member 166D with the return of slide 126 to its initial position by means of spring 131.

Accordingly, all of the elements of the apparatus 10 are returned to their original positions at the conclusion of the fast-forward mode of operation.

REWIND MODE OF OPERATION

When pushbutton 30 is actuated to select the rewind mode of operation, its latch element 45 is engaged in the respective keeper slot 44 of latch member 37 for retaining pushbutton 30 in its operative position. The movement of pushbutton 30 to its operative position causes angular displacement or skewing of control member 95 in the counterclockwise direction, as viewed on FIG. 4, so that slide 87 is displaced laterally toward the right for causing the movement of idler wheel 89 into engagement with the peripheries of wheels 91 and 24C. Further, such angular displacement of control member 95 causes its flange 120 to effect rearward displacement of brake release member 112. The rearward displacement of brake release slide 112 causes closing of the contacts of switch 123 for energizing drive motor 61 and also causes release of brake elements 105 and 106 from the reel support members, as described above. Thus, reel drive shaft 24A is driven at high speed in the direction for rewinding tape on the supply reel rotatably coupled therewith. During such high speed rewinding of the tape on the supply reel, heads 52 and 53 and pinch roller 56 are held out of engagement with the tape as carriage 47 remains in its forward inoperative position.

AUTOMATIC SHUT-OFF DURING REWIND MODE OF OPERATION

During the rewind mode of operation, and for so long as tape remains on the reel coupled with shaft 23A of reel support member 23, the rotation of that reel support member causes frictional urging of plate 160 in the counterclockwise direction, as viewed on FIG. 7, so that the rotation of cam member 146 from fly wheel 65 can cause pawl member 142 to effect reciprocation of slide 126 between the positions shown on FIGS. 10A and 10B with pin or abutment 165 entering arm portion 166B of slot 166 during each return of slide 126 to its initial position shown on FIG. 10A. However, when the tape is completely rewound on the reel coupled with reel drive shaft 24A, that is, when the tape is fully unwound from the take-up reel engaged with reel support member 23, the rotation of the reel drive shafts 23A and 24A is halted, with consequent slippage in the frictional clutches of the respective reel support members, so that plate 160 is no longer frictionally urged in the counterclockwise direction, as viewed on FIG. 7, during the continued rotation of cam member 146 from fly wheel 65. Accordingly, when stop member 166D blocks the return of slide 126 to its initial position, pawl member 142 shifts from engagement with tooth 140 to engagement with tooth 141 so that, during the following forward stroke of pawl member 142 slide 126 is moved to the position shown on FIG. 10C to effect the release of latch member 37 from pushbutton 30. The released pushbutton 30 is returned by the respective spring 35 to its inoperative position and spring 98 accordingly returns control member 95 to its inoperative position shown on FIG. 4. Thus, slide 87 is restored to the position shown on FIG. 4 to disengage idler wheel 89 from wheels 91 and 24C, and flange 120 permits the return of brake release slide 112 in the forward direction by spring 113. The forward displacement of slide 112, as in the previously-described modes of operation, permits the engagement of brake elements 105 and 106 with reel support members 23 and 24 and also permits the return of the contacts of switch 123 to their normally open condition for de-energizing drive motor 61. The forward return of slide 112 again causes its lug 119 to act on lever 167 for effecting the release of pawl member 142 from tooth 141 and the biasing of plate 160 in the counterclockwise direction, as viewed on FIG. 7, so that spring 131 can return slide 126 to its initial position. Accordingly, automatic shut-off at the conclusion of the rewind mode of operation again returns all of the elements of apparatus 10 to their original positions.

It will be apparent that the automatic shut-off device 124 provided in the above-described apparatus 10 according to this invention is effective to cause automatic shut-off in each of the selected modes of operation. Further, such automatic shut-off device 124 is operative in the desired manner without requiring the engagement of any part or element of that device with the magnetic tape, and thus does not adversely influence the movement of that tape during any of the modes of operation of the apparatus. It will also be seen that the automatic shut-off device 124 according to this invention is operative with any conventional magnetic tape in a cassette, or otherwise, and does not require the provision of either conductive or light transmitting leads at the ends of such tape. Further, since no part or element of the automatic shut-off device 124 is engageable with the tape in a cassette, there is no need to provide the cassette housing with special openings for reception of a part or element of the shut-off device.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. An apparatus for recording and/or reproducing signals on a magnetic tape extending between first and second reels to which the ends of the tape are secured and on which the tape is wound; comprising first and second rotatable reel support members for rotational coupling with the first and second reels, respectively, drive means, drive control means actuable to effect operation of said drive means, transmission means for urging a selected one of said reel support members to rotate in the direction for winding tape on the reel respectively coupled therewith in response to operation of said drive means and permitting continued operation of said drive means when rotation of said reel support members is arrested upon the full unwinding of the tape from one of said reels, shut-off means powered by said drive means and having a first operative condition for causing said drive control means to halt the operation of said drive means and a second inoperative condition in which said drive control means is unaffected by said shut-off means, and shut-off control means connected with one of said reel support members for disposing said shut-off means in said second inoperative condition in response to rotation of said one reel support member and for disposing said shut-off means in said first operative condition in response to arresting of the rotation of said reel support members during continued operation of said drive means.

2. An apparatus for recording and/or reproducing signals on a magnetic tape extending between first and second reels to which the ends of the tape are secured and on which the tape is wound; comprising first and second rotatable reel support members for rotational coupling with the first and second reels, respectively; drive means including an electric motor; control means including switch means having a normal inoperative condition and being actuable to an operative condition for energizing said motor and thereby effecting operation of said drive means, manually operable actuating means movable from a normal inoperative position to an operative position for actuating said switch means to said operative condition of the latter, and latch means for releasably holding said actuating means in said operative position thereof; transmission means for urging a selected one of said reel support members to rotate in the direction for winding tape on the reel respectively coupled therewith in response to operation of said drive means and permitting continued operation of said drive means when rotation of said reel support members is arrested upon the full unwinding of the tape from one of said reels; and shut-off means including latch release means displaceable to a predetermined extent for releasing said latch means, and latch release operating means driven from said drive means for displacing said latch release means to said predetermined extent only when the rotation of said reel support members is arrested during the continued operation of said drive means.

3. An apparatus according to claim 2: in which said latch release means includes a reciprocable member having a plurality of teeth thereon and spring means urging said reciprocable member in one direction to an initial position, and said reciprocable member is displaceable to said predetermined extent from said initial position in the direction opposite to said one direction; and said latch release operating means includes stop means which frees said reciprocable member for movement by said spring means to said initial position so long as said reel support members are rotating and is positioned in response to arresting of the rotation of said reel support members for limiting the movement of said reciprocable member in said one direction to an intermediate position short of said initial position, a reciprocable pawl member engageable with said teeth of the reciprocable member, and means driven by said drive means for reciprocating said pawl member through a stroke that is shorter than said predetermined extent of the displacement of said reciprocable member by a distance substantially equal to the distance between said initial and intermediate positions of said reciprocable member, so that said pawl member displaces said reciprocable member to said predetermined extent for releasing said latch means only following the positioning of said stop means for limiting the movement of said reciprocable member at said intermediate position.

4. An apparatus according to claim 3: in which said latch release operating means further includes pawl disengaging means operative upon the return of said manually operable actuating means to said normal inoperative position of the latter for disengaging said pawl member from said teeth of said reciprocable member.

5. An apparatus according to claim 3: in which said stop means includes an abutment movable with said reciprocable member, a stop member projectable into the path of movement of said abutment with said reciprocable member in said one direction for limiting said movement to said intermediate position, and means responsive to rotation of at least one of said reel support members for withdrawing said stop member from said path of movement of said abutment.

6. An apparatus according to claim 5: in which a plate is pivotally mounted for swinging to either side of a centered position and has a generally Y-shaped slot therein slidably receiving said abutment, said Y-shaped slot has a stem portion and branched arm portions diverging from said stem portion with said stop member being defined by a portion of said plate between said branched arm portions which is engageable by said abutment when said plate is in said centered position; and said means for withdrawing the stop member from the path of movement of said abutment includes rotational transmission means connected between one of said reel support members and said pivotally mounted plate and having a frictional coupling for urging said plate to one side of said centered position so long as said one reel support member is rotating.

7. An apparatus according to claim 3: in which said means for reciprocating said pawl member includes a cam member connected with said drive means for rotation by the latter, pivotally mounted lever means carrying said pawl member for reciprocating the latter in response to rocking of said lever means, and means on said lever means engaging said cam member for rocking said lever means in response to rotation of said cam member.

8. An apparatus according to claim 2: further comprising brake means engageable for braking the rotation of said reel support members, and brake releasing means operable by the movement of said manually operable actuating means to said operative position of the latter for releasing said brake means; and in which said switch means includes an actuating member engageable by said brake releasing means upon operation of the latter for actuating said switch means to said operative condition of the latter.

9. An apparatus according to claim 2: in which said manually operable actuating means includes a plurality of operating mode selecting members individually movable between respective normal inoperative and operative positions, and means engageable by at least certain of said mode selecting members upon selective movement of the latter to said operative position thereof for actuating said switch means to said operative condition; said latch means includes a latch member common to all of said mode selecting members and having keepers for at least said certain mode selecting members, a latch element extending from each of said certain mode selecting members and being engageable in the respective keeper of said latch member when the respective mode selecting member is moved to its said operative position, means mounting said latch member for movement between a latching position for receiving the latch elements of said mode selecting members in the respective keepers and a released position in which any of said latch elements is freed from said respective keepers, and means urging said latch member to said latching position; and said latch release means moves said latch member to said released position upon the displacement of said latch release means to said predetermined extent.

10. An apparatus according to claim 9: in which another of said mode selecting members has a releasing element which engages said latch member and moves the latter to said released position in response to manual actuation of said other mode selecting member to its operative position, whereby to halt the operation of said drive means even though wound tape remains on both of the reels.

11. An apparatus according to claim 9: in which said means engageable by at least certain of said mode selecting members for actuating said switch means includes a carriage carrying at least one magnetic head and being shiftable to an operative position in which said head is engageable with the tape extending between reels on said reel support members in response to movement of a first one of said certain mode selecting members to the operative position thereof, and a brake releasing member movable to actuate said switch means to its operative condition in response to the shifting of said carriage to said operative position of the latter; and further comprising braking means urged to an engaged position to brake the rotation of said reel support members and being disengaged in response to movement of said brake releasing member by said shifting of the carriage, a capstan rotated by said drive means, and pinch roller means mounted on said carriage and moved against said capstan for driving the tape therebetween upon shifting of said carriage to its operative position.

12. An apparatus according to claim 11: in which said transmission means includes an idler wheel driven from drive means and engageable with one of said reel support members for rotating the latter at a predetermined speed for recording and reproducing signals on the tape, and idler disengaging means normally disengaging said idler wheel from said one reel support member and being rendered inactive upon said shifting of said carriage to its operative position.

13. An apparatus according to claim 12: in which said means for actuating the switch means further includes an auxiliary control member swingable in opposite directions from a normal centered position in response to selective movement of second and third mode selecting members of said certain mode selecting members to their respective operative positions, and means on said auxiliary control member engageable with said brake releasing member to move the latter for actuating said switch means in response to swinging of said auxiliary control member from said centered position; and in which said transmission means includes fast forward and fast rewind drive assemblies operable by said drive means and alternately engaged with said one reel support member and the other of said reel support members, respectively, in response to the swinging of said auxiliary control member in one of said directions and the other of said directions, respectively, from said centered position thereof.

14. An apparatus according to claim 2: in which said latch release means includes a reciprocable member having a plurality of teeth thereon and spring means urging said reciprocable member in one direction to an initial position, and said reciprocable member is displaceable to said predetermined extent from said initial position in the direction opposite to said one direction; and said latch release operating means includes stop means which frees said reciprocable member for movement by said spring means to said initial position so long as said reel support members are rotating and is positioned in response to arresting of the rotation of said reel support members for limiting the movement of said reciprocable member in said one direction to an intermediate position short of said initial position, a reciprocable pawl member engageable with said teeth of the reciprocable member, and means driven by said drive means for reciprocating said pawl member through a stroke that is shorter than said predetermined extent of the displacement of said reciprocable member by a distance substantially equal to the distance between said initial and intermediate positions of said reciprocable member, so that said pawl member displaces said reciprocable member to said predetermined extent for releasing said latch means only following the positioning of said stop means for limiting the movement of said reciprocable member at said intermediate position.

15. An apparatus according to claim 14: in which said latch release operating means further includes pawl disengaging means operative upon the return of said control means to said normal inoperative position of the latter for disengaging said pawl member from said teeth of said reciprocable member.

16. An apparatus according to claim 14: in which said stop means includes an abutment movable with said reciprocable member, a stop member projectable into the path of movement of said abutment with said reciprocable member in said one direction for limiting said movement to said intermediate position, and means responsive to rotation of at least one of said reel support members for withdrawing said stop member from said path of movement of said abutment.

17. An apparatus according to claim 16: in which a plate is pivotally mounted for swinging to either side of a centered position and has a generally Y-shaped slot therein slidably receiving said abutment, said Y-shaped slot has a stem portion and branched arm portions diverging from said stem portion with said stop member being defined by a portion of said plate between said branched arm portions which is engageable by said abutment when said plate is in said centered position; and said means for withdrawing the stop member from the path of movement of said abutment includes rotational transmission means connected between one of said reel support members and said pivotally mounted plate and having a frictional coupling for urging said plate to one side of said centered position so long as said one reel support member is rotating.

18. An apparatus according to claim 14: in which said means for reciprocating said pawl member includes a cam member connected with said drive means for rotation by the latter, pivotally mounted lever means carrying said pawl member for reciprocating the latter in response to rocking of said lever means, and means on said lever means engaging said cam member for rocking said lever means in response to rotation of said cam member.

* * * * *